May 21, 1968  G. N. JORGENSEN ET AL  3,384,854
PLUG-IN BUS DUCT
Filed Jan. 6, 1966  6 Sheets-Sheet 2
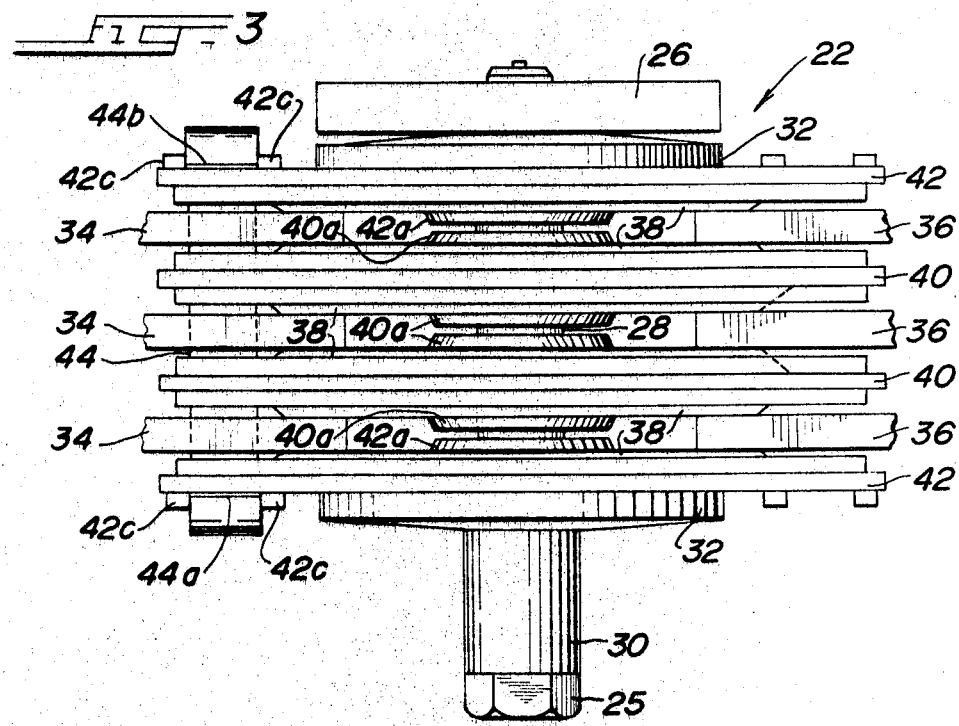
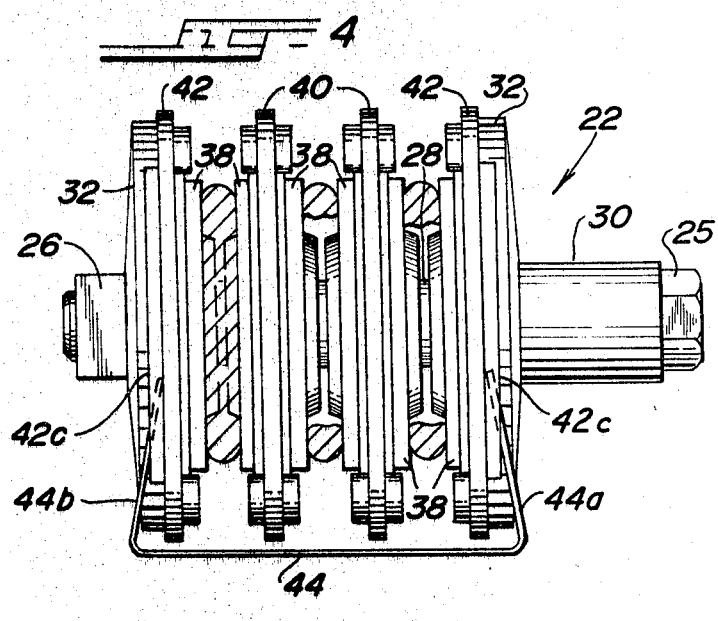
INVENTORS
GEORGE N. JORGENSEN
HARRIS I. STANBACK
BY Paul J. Rose
ATTY

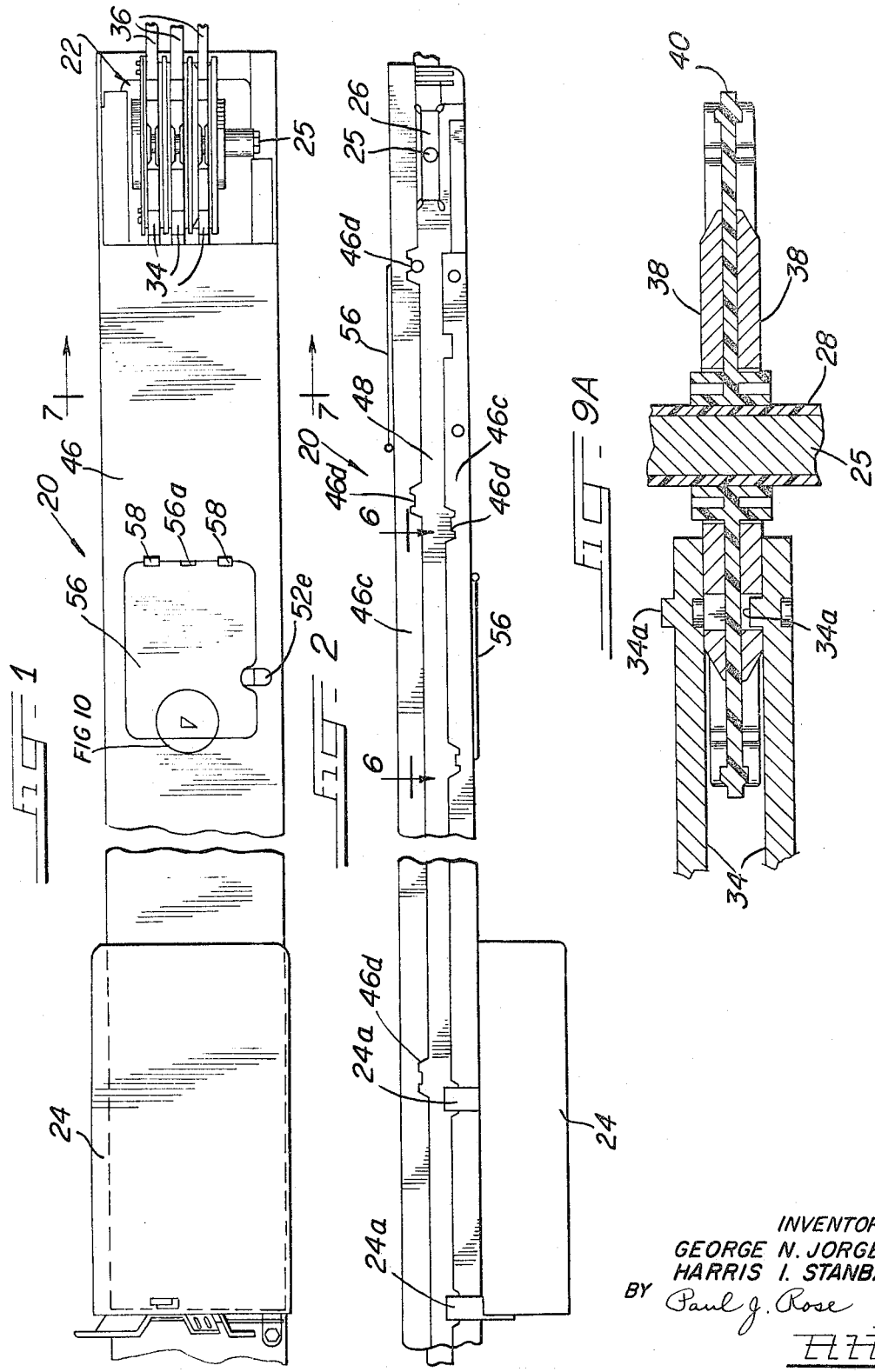

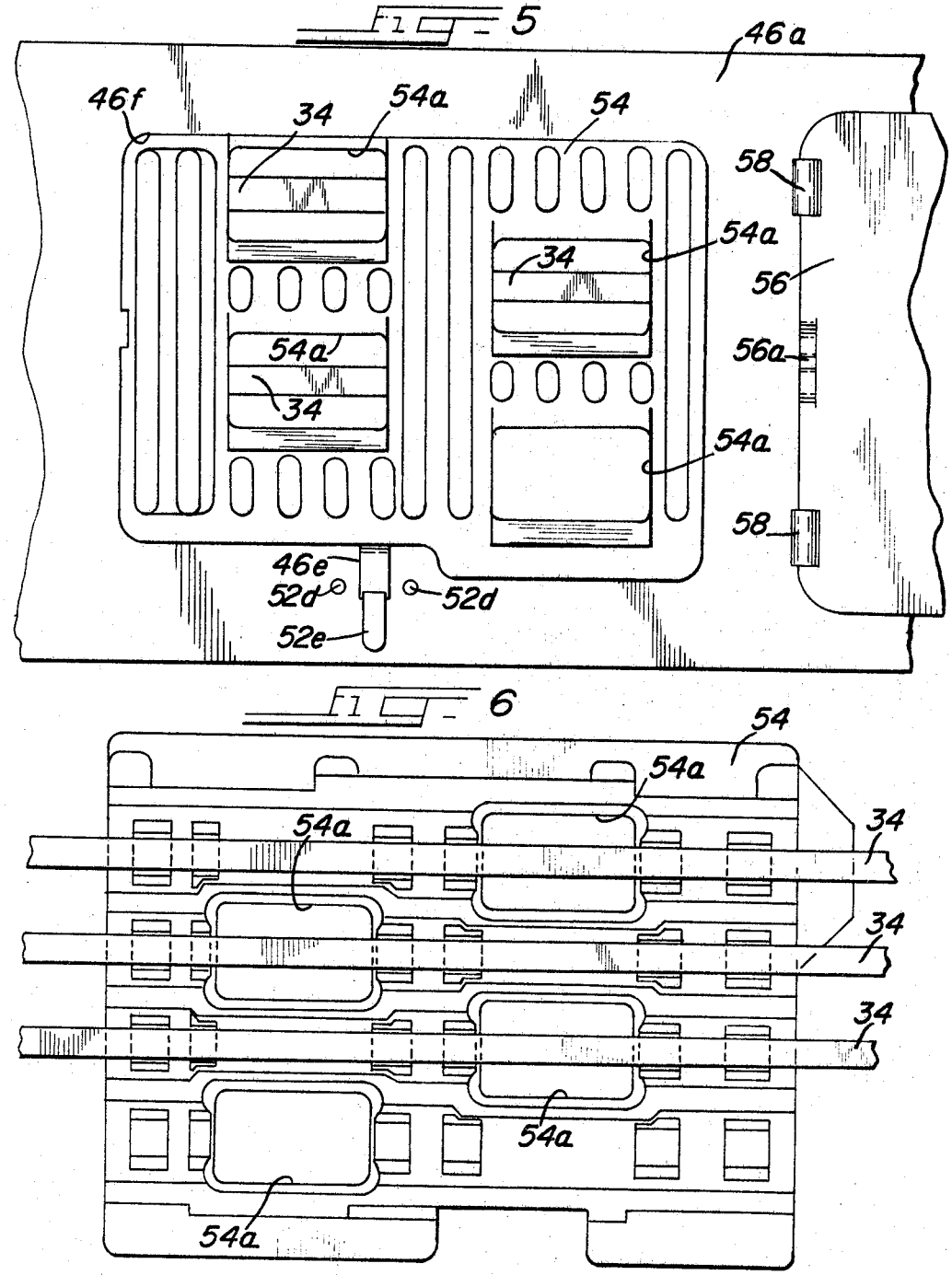

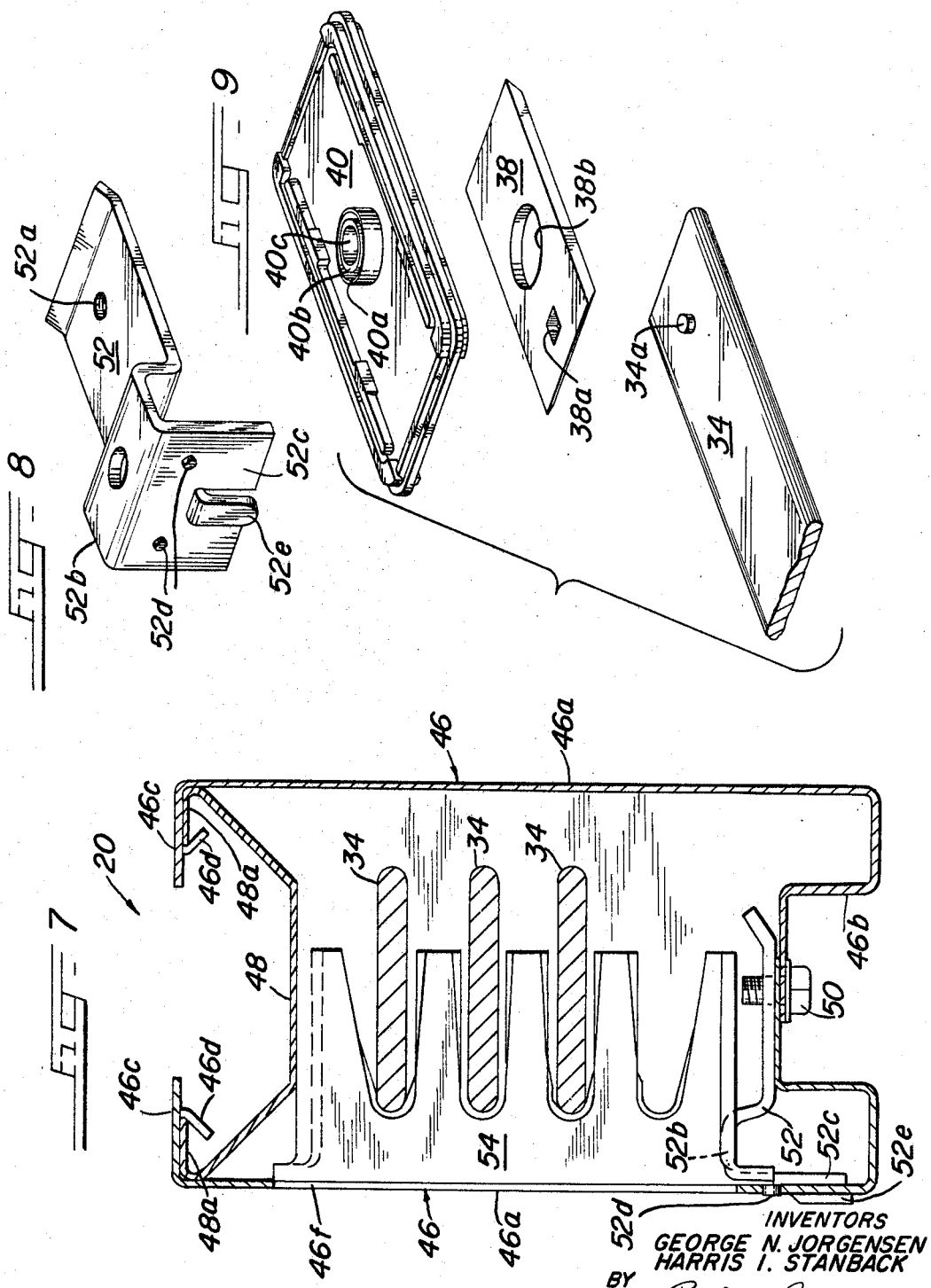

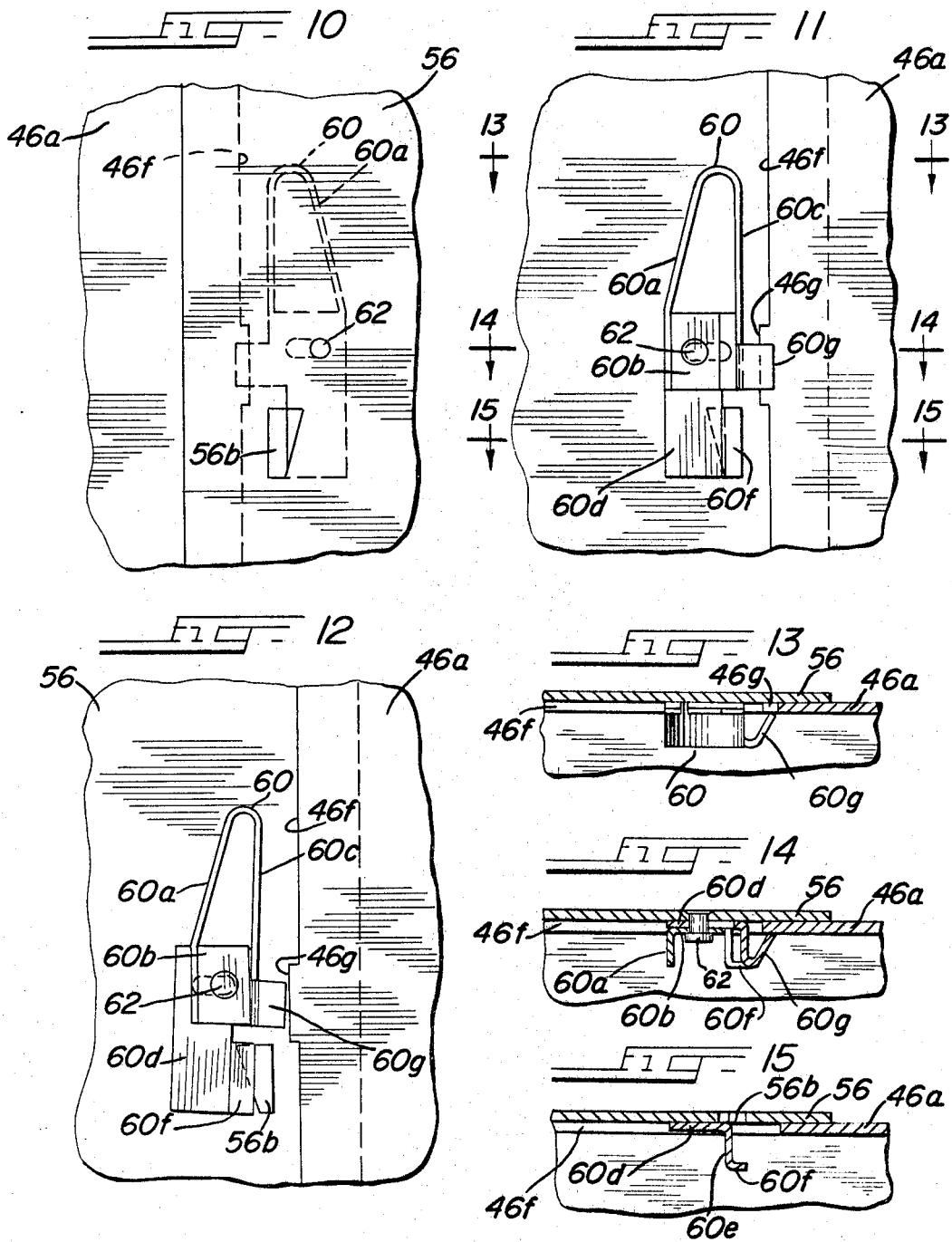

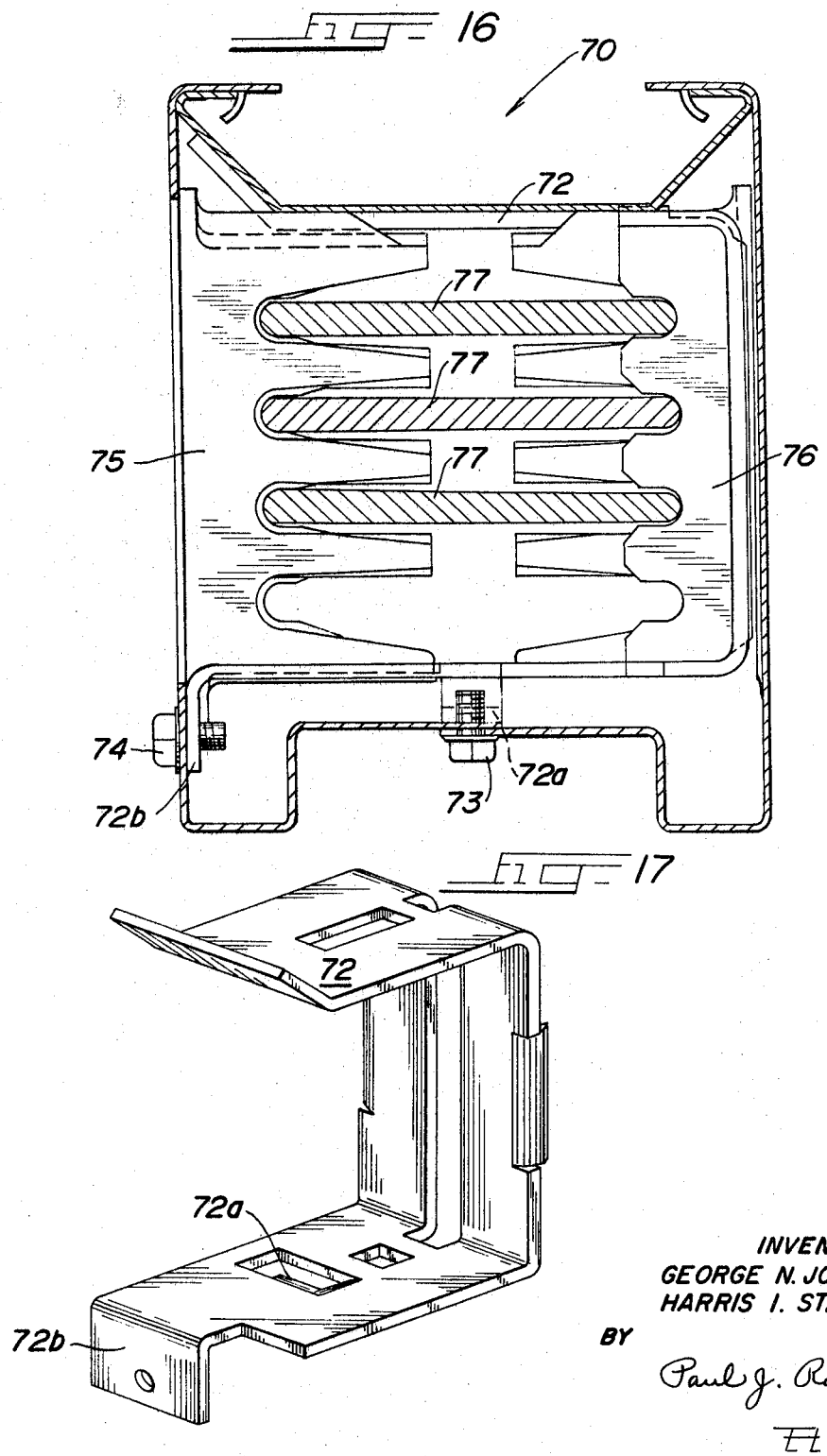

United States Patent Office 3,384,854
Patented May 21, 1968

3,384,854
PLUG-IN BUS DUCT
George N. Jorgensen and Harris I. Stanback, Lexington, Ky., assignors to Square D Company, Park Ridge, Ill., a corporation of Michigan
Filed Jan. 6, 1966, Ser. No. 519,095
14 Claims. (Cl. 339—22)

ABSTRACT OF THE DISCLOSURE

The duct has a housing capacity for four bus bars, the bus bars being accessible for plug-in connections from both sides of the duct. Each duct section has a joint structure at one end to permit connection to an adjoining section with adequate insulation and proper spacing between the bus bars. The housing is shaped to facilitate the mounting of plug-in units and the suspension of the duct.

---

This invention relates to plug-in bus duct.

An object of the invention is to provide an improved compact joint for connecting a pair of sections of plug-in bus duct having flat bus bars of relatively narrow width, including novel means of providing sufficient electrical surface clearance between different-phase current paths through the joint, novel means of enabling a section of bus duct to be readily inserted in a joint structure carried by another section of bus duct, and novel means of interlocking tie plates and insulators to the bus bars of a bus duct section carrying a joint structure.

Another object is to provide an improved housing for plug-in bus duct.

A further object is to provide improved means for supporting the bus bars and bracing the housing of plug-in bus duct.

Yet another object is to provide an improved door and latch assembly for plug-in bus duct.

In the drawings,

FIG. 1 is a fragmentary side elevational view of a plug-in bus duct constructed in accordance with the invention, showing a duct plug mounted thereon and including a joint structure carried at the right-hand end thereof;

FIG. 2 is a top plan view of the bus duct of FIG. 1;

FIG. 3 is an enlarged side elevational view of the joint structure carried by the right-hand end portion of the bus duct of FIG. 1, omitting the bus duct housing but showing the right-hand end portions of the bus bars of the bus duct of FIG. 1 and the left-hand end portions of the bus bars of a connecting bus duct;

FIG. 4 is an end elevational view of the joint structure of FIG. 3, taken from the left-hand side thereof and showing the bus bars of the bus duct of FIG. 1 partially in section and partially broken away;

FIG. 5 is a fragmentary side elevational view of the bus duct of FIG. 1, showing one of the plug-in openings when its respective door is open to permit plugging a duct plug onto the bus bars;

FIG. 6 is an inner side elevational view of one of the bus duct supports of the bus duct of FIG. 1, taken along the line 6—6 of FIG. 2 and showing portions of the bus bars;

FIG. 7 is a sectional view taken along the line 7—7 of FIG. 1 and omitting the joint structure for clarity;

FIG. 8 is a perspective view of one of the brackets for bracing the housing of the bus duct of FIG. 1 and holding a respective bus bar support in position;

FIG. 9 is an exploded perspective view of an end portion of one of the bus bars of the bus duct of FIG. 1 and a tie plate and an insulating plate of the joint structure;

FIG. 9A is a sectional view through a portion of the joint structure of the bus duct of FIG. 1;

FIG. 10 is an enlargement of the indicated circled portion of the bus duct of FIG. 1, showing the portion of a door for a plug-in opening which carries the latch;

FIG. 11 is a view similar to FIG. 10, but taken from the inside of the door and showing the latch carried thereby;

FIG. 12 is a view similar to FIG. 11, but showing the latch in released position;

FIG. 13 is a sectional view taken along the line 13—13 of FIG. 11;

FIG. 14 is a sectional view taken along the line 14—14 of FIG. 11;

FIG. 15 is a sectional view taken along the line 15—15 of FIG. 11;

FIG. 16 is a view similar to FIG. 7, but showing a bus duct of higher current rating than the current rating of the bus duct of FIG. 1; and FIG. 17 is a perspective view of one of the brackets for bracing the housing of the bus duct of FIG. 16 and holding respective bus bar supports in position.

In the drawings, a section of plug-in bus duct 20 constructed in accordance with the invention and including a joint structure 22 is fragmentarily shown in FIGS. 1 and 2 with a conventional duct plug 24 mounted thereon.

The joint structure 22 is best shown in FIGS. 3 and 4, in which the bus duct housing has been omitted for clarity. The joint structure 22 includes a bolt 25 and an elongated nut 26 which is received in a correspondingly shaped aperture located in the top wall portion of the bus duct housing and defined by extruded or upwardly bent portions of the top wall portion. The nut 26 may be seen through the aperture in the top wall portion of the bus duct housing, as indicated in FIG. 2. The joint structure 22 may thus be tightened from the bottom of the bus duct 20 merely by turning the bolt 25.

The bolt 25 is provided with an insulating sleeve 28 the length of which is not shown but which extends from the head of the bolt substantially all the way to the nut 26. A metal spacer sleeve 30 is provided adjacent the head of the bolt 25, and a pair of large spring washers 32 are provided respectively adjacent the nut 26 and the sleeve 30.

The bus duct 20 is shown as having three bus bars 34, but it is provided with space for four bus bars 34 if a fourth bus bar 34 is desired to provide a three-phase, four-wire electrical power supply system. The joint structure 22 is assembled with the bus bars 34 of the bus duct 20 at the factory. FIGS. 1 and 3 also fragmentarily show three bus bars 36 of a second section of bus duct the remainder of which is not shown but which is identical to the bus duct section 20. Each bus bar 34 is shown in FIGS. 1 and 3 as electrically connected to a respective bus bar 36 by a pair of tie plates 38 best shown in FIG. 9. Four insulating plates are disposed in alternately spaced relationship to the three sets of bus bars 34 and 36, two inner insulating plates 40 being identical on opposite sides and two outer insulating plates 42 having only their inner sides identical to the sides of the inner insulating plates 40. Each inner insulating plate 40 has a pair of the tie plates 38 respectively partially recessed therein on opposite sides, and each outer insulating plate 42 has one of the tie plates 38 partially recessed therein on its inner side.

As shown in FIG. 9, each bus bar 34 is provided with a partially sheared projection 34a, and each tie plate 38 is provided adjacent one end with a hole 38a in which a projection 34a may be received. Further, each inner insulating plate 40 is provided on each side with a pair of projecting concentric circular ribs including a larger outer rib 40a and a smaller inner rib 40b, the inner rib 40b defining a hole 40c through the plate for receiving the bolt 25 and sleeve 28. Each outer insulating plate 42 is provided only on its inner side with a pair of concentric circular ribs like the ribs 40a and 40b on the inner insulating plates 40, the outer ribs 42a of the plates 42 being visible in FIGS. 3 and 4. Each tie plate 38 is provided with a central hole 38b for receiving the bolt 25, the sleeve 28, and the concentric circular ribs of an insulating plate 40 or 42.

FIG. 9A shows the relationship between one insulating plate 40, a pair of the tie plates 38, and a pair of the bus bars 34 on opposite sides of the insulating plate 40. It will be noted that one of the tie plates 38 is retained by a projection 34a of an associated bus bar 34, the insulating plate 40 is retained by this one tie plate, and the other tie plate 38 is retained by the insulating plate 40.

FIGS. 3 and 4 show a generally U-shaped spring clip 44 each of the leg portions 44a and 44b of which is received between a pair of projections 42c on the outer side of a respective one of the outer insulating plates 42. The clip 44 aids in retaining the projections 34a in their respective tie plates 38, and also retains the lower insulating plate 42 in FIG. 3 and its respective tie plate 38, which has no projection 34a retaining it. The entire joint structure 22 is thus held in assembled relationship with the bus bars 34 by the projections 34a and the clip 44. Further, before assembly of the bus duct section 20 with a connecting duct section, the clip 44 pulls the left end portions of the insulating plates 40 and 42 together and spreads the right end portions thereof apart in FIG. 3 for easy reception of the bus bars 36 of the connecting section of bus duct.

Not only do the circular ribs 40a on the insulating plates 40 retain the tie plates 38 which do not have a mechanical connection to a bus bar 34 by a projection 34a, but the concentric ribs 40a and 40b help provide the required over-the-surface electrical clearance between the bus bars 34.

The housing of the bus duct 20 is easy to assemble and consists of only three parts, as best shown in FIG. 7, although it still provides the required inwardly turned flanges at the top for hanging the bus duct by a hanger such as disclosed in copending application, Ser. No. 503,252, filed on Oct. 23, 1965, now Patent 3,345,022, and assigned to the assignee of this application, and for the mounting of a duct plug 24 thereon, and the required groove in the bottom for the clamping of a duct plug 24 to the bus duct. Two parts 46 of the housing are identically formed, but reversed end-to-end with respect to each other in the assembly. The parts 46 are shaped as shown, each one forming a side 46a of the housing, one-half of a grooved bottom 46b of the housing, and an upper flange 46c at the top of the housing.

A third part 48 forms the top of the housing and is shaped as shown to provide a pair of inwardly extending flanges 48a underlying the flanges 46c. The flanges 46c are notched at intervals as shown in FIG. 2 for locating hanging hooks 24a, provided on duct plugs such as the duct plug 24, longitudinally of the bus duct 20. Within each notch is an ear 46d which is bent over the respective flange 48a as shown in FIG. 7 to secure the top part 48 of the housing to the parts 46. The parts 46 of the housing are secured together at the bottom by a plurality of screws, such as a screw 50 shown in FIG. 7, spaced in a row longitudinally of the bus duct 20. The screws 50 are threaded into brackets 52 such as is shown in FIG. 8.

The brackets 52 perform three functions. Thus, each bracket 52 is provided with a threaded hole 52a and thus serves as a nut for one of the screws 50 in holding the two parts 46 of the housing together. Further, each bracket 52 is formed with a support portion 52b which is received in a bus bar support 54 formed of insulating material to position the bus bar support 54 longitudinally of the housing as well as to hold it in position against the top part 48 of the housing. In addition, each bracket 52 braces one of the sides 46a of the housing and is provided with a bracing end portion 52c which lies along the inside of the respective side 46a, a pair of partially sheared projections 52d which project into holes in the side 46a (see FIG. 5), and an offset tongue 52e which extends through a slot 46e in the side 46a and lies along the outside of the side 46a. For ease in assembling, the brackets 52 may be snapped on the sides 46a, by means of the projections 52d and offset tongue 52e, before the parts 46 are secured together by the screws 50. It will be understood that the bus bar supports 54 and the brackets 52, which constitute bus bar supporting means, are alternately reversed from each other longitudinally of the housing.

The front and rear of the bus bar supports 54 appear as shown respectively in FIGS. 5 and 6. The bus bar supports 54 are appropriately molded to support four bus bars 34 and are provided with four openings 54a for receiving the plug-in jaws of a duct plug 24, though only three bus bars 34 are shown in the illustrated embodiment of the invention. At the location of each bus bar support 54, the respective side 46a of the housing is provided with a plug-in opening 46f (FIGS. 5 and 7) which is normally covered, when not in use, by a latched door 56 (FIGS. 1, 2 and 5) hinged to the respective side 46a by a pair of hinges 58 and provided with a lanced portion 56a which interferes with the side 46a in the opening and closing of the door and thus maintains the door 56 in open position if desired. The slot 46e through which the respective tongue 52e extends is a part of the respective opening 46f.

A door latch 60 for one of the doors 56 is best shown in FIGS. 10 through 15. The door latch 60 is formed in one piece as a generally U-shaped spring member with various bent-over projections and is secured to the inside of the door 56 by a single rivet 62. One leg portion 60a of the latch 60 is held substantially stationary by an anchoring portion 60b through which the rivet extends without clearance. The other leg portion 60c is movable by an actuating portion 60d connected thereto and slotted at the rivet 62. The actuating portion 60d is provided with a bent-over portion 60e engageable by a screwdriver through a hole 56b in the door 56 and with an offset portion 60f limiting the penetration of the screwdriver (not shown) into the housing. A latching portion 60g on the leg portion 60c normally engages a projection 46g extending into the opening 46f from the remainder of the side 46a of the housing. If desired, the latching portion 60g could be made to engage the side 46a directly and the projection 46g could be eliminated. FIG. 12 shows the unlatched position of the latch 60, the latching portion 60g having been moved out of alignment with the projection 46g as by insertion of a screwdriver (not shown) through the opening 56b in the door 56 into engagement with the offset portion 60f and the twisting of the screwdriver in the opening 56b.

FIG. 16 shows a section through a bus duct 70 and is similar to FIG. 7. However, the bus duct 70 has a higher short-circuit rating than the bus duct 20 shown in FIG. 7. The housing of the bus duct 70 is wider, but otherwise similar to the housing of the bus duct 20. The brackets 52 of the bus duct 20 are replaced by generally U-shaped brackets 72, such as shown in FIG. 17, in the bus duct 70. Each bracket 72 is provided with a bent-over tab 72a which serves as a nut for a screw 73 which secures the two combination side-and-bottom parts of the housing together. The free end portion of one of the leg portions of the bracket 72 is bent outwardly to form a tab 72b which serves as a nut for a screw 74 which secures the bracket to a side of the housing. Each bracket 72 positions a bus bar support 75 similar to the bus bar supports 54 but formed of stronger insulating material. Further, each bracket 72 also positions a back-up bus bar support 76. Three bus bars 77 are supported by the bus bar supports 75 and 76, and space is provided for supporting an additional one if desired. The bus bars 77 are wider than the bus bars 34 to provide greater current carrying capacity. The free end portion of the other leg portion of each bracket 72 is bent outwardly to anchor it against the top portion of the housing.

The invention is claimed as follows:

1. A plug-in bus duct comprising an elongated rectangular housing enclosing a plurality of bus bars, said housing being formed of three sheet metal parts, each of two of said parts forming a side and a portion of a grooved bottom of said housing, a plurality of fastening means spaced longitudinally at the bottom of said housing and securing said two parts to each other, a plurality of longitudinally spaced bus bar supporting means, each fastening means also fixing the lower portion of one of said supporting means with respect to the housing, a third of said housing parts being secured to said two housing parts and forming a top of said housing and engaging an upper portion of said supporting means.

2. A plug-in bus duct as claimed in claim 1, wherein said two parts are similarly shaped but reversed end-to-end with respect to each other.

3. The plug-in bus duct of claim 1 wherein each of said two housing parts are provided with an upper flange extending toward the other of said two parts, and said third housing part is provided with a pair of inwardly extending flanges respectively underlying and secured to the upper flanges of said two parts, said upper flanges extending inwardly respectively of said underlying flanges to facilitate the attachment of the bus duct to a hanger mount.

4. A bus duct as claimed in claim 3, wherein the upper flanges of said two parts are provided respectively with a plurality of ears bent respectively over the edges of the flanges of said third part to secure said two parts to said third part.

5. A bus duct as claimed in claim 1 wherein said supporting means are alternately reversed with respect to each other and secured to opposite sides of the housing.

6. A bus duct as claimed in claim 1 wherein said fastening means are screws, each of said supporting means includes a generally flat bracket having a hook-like projection, a side wall of the housing has a plurality of longitudinally spaced slots, and each of said brackets is secured to the side of said housing by reception of its projection into one of said slots and to the bottom of the housing by one of said screws.

7. A bus duct as claimed in claim 1 wherein each of said supporting means includes a generally U-shaped bracket partially surrounding the bus bar support of its associated supporting means with its bight portion engaging one side of said housing and one leg portion engaging the top of said housing.

8. A bus duct as claimed in claim 1 wherein each of said bus bar supporting means comprises an insulating bus bar support and a bracket, said bus bar supports being held in position in said housing by its associated one of said brackets, and said bus bars being held in spaced relationship to each other by said bus bar supports.

9. A bus duct as claimed in claim 8, wherein each of said bus bar supports is provided with a plurality of openings affording access respectively to said bus bars, and including a plurality of back-up bus bar supports respectively held in position in said housing by said brackets, each of said back-up bus bar supports being disposed on the opposite side of said bus bars from a respective one of the bus bar supports having said access openings therein.

10. A plug-in bus duct comprising an elongated housing, a plurality of at least three spaced elongated flat bus bars disposed in said housing, and a joint structure connected to the end portions of said bus bars disposed adjacent one end of said housing, said joint structure including a plurality of insulating plates disposed in alternately spaced relationship with said bus bars and in only partially overlapping relationship with said end portions thereof so as to extend outwardly therefrom longitudinally of said bus bars, there being one more insulating plate than the number of bus bars so that two outer insulating plates are disposed outwardly of the outer two bus bars, each of the two outer insulating plates having an electrically conductive tie plate disposed on the inner side thereof for engagement by the respective outer bus bar, each of the inner insulating plates having a pair of electrically conductive tie plates disposed respectively on opposite sides thereof for engagement respectively by a pair of said bus bars, each of said insulating plates and tie plates having a central hole extending therethrough, a bolt extending through said insulating plates and tie plates and disposed in the central holes thereof, and each side of each of said inner insulating plates having a circular raised rib portion disposed in the central hole of its respective tie plate concentrically of said bolt and extending beyond its respective tie plate.

11. A bus duct as claimed in claim 10, wherein each side of each of said inner insulating plates is provided with a pair of concentric circular raised rib portions disposed in the central hole of the respective tie plate concentrically of said bolt and extending beyond the respective tie plate.

12. A bus duct as claimed in claim 11, wherein the inner side of each of said two outer insulating plates is provided with a pair of concentric circular raised rib portions disposed in the central hole of the respective tie plate concentrically of said bolt and extending beyond the respective tie plate.

13. A bus duct as claimed in claim 10, wherein each of said bus bars has a projection on one side extending into a respective one of said tie plates.

14. A bus duct as claimed in claim 10, including a generally U-shaped spring clip engaging the outer sides of said two outer insulating plates adjacent the end portions thereof overlapping said bus bars and tending to spread the other end portions of said insulating plates and tie plates apart for easy reception of bus bars of a connecting bus duct.

References Cited

UNITED STATES PATENTS

| 2,343,232 | 2/1944  | Togesen        | 339—22  |
| 2,742,173 | 4/1956  | Janson         | 174—52  |
| 3,004,096 | 10/1961 | Rowe           | 174—88  |
| 3,004,097 | 10/1961 | Johnston et al.| 174—88  |
| 3,031,521 | 4/1962  | Krauss et al.  | 174—88  |
| 3,189,680 | 6/1965  | Stanback       | 174—88  |
| 3,207,839 | 9/1965  | Joly           | 174—88 X|
| 3,229,029 | 1/1966  | Weiss          | 174—101 |

OTHER REFERENCES

Tyrrell: IBM Technical Disclosure Bulletin, vol. 3, No. 10, March 1961, page 5.

LARAMIE E. ASKIN, *Primary Examiner.*